United States Patent
Huang et al.

(10) Patent No.: US 10,437,390 B2
(45) Date of Patent: Oct. 8, 2019

(54) FRAME FASTENING ASSEMBLY, FRAME ASSEMBLY AND METHOD OF MOUNTING A FRAME

(71) Applicant: Wistron Corporation, New Taipei (TW)

(72) Inventors: Po-Liang Huang, New Taipei (TW); Shih-Che Chien, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 323 days.

(21) Appl. No.: 15/215,124

(22) Filed: Jul. 20, 2016

(65) Prior Publication Data

US 2017/0220204 A1    Aug. 3, 2017

(30) Foreign Application Priority Data

Feb. 1, 2016   (TW) .............................. 105103167 A (51) Int. Cl.
| | |
|---|---|
| *A47G 1/16* | (2006.01) |
| *G06F 3/042* | (2006.01) |
| *A47G 1/17* | (2006.01) |

(52) U.S. Cl.
CPC ......... *G06F 3/0428* (2013.01); *A47G 1/1606* (2013.01); *A47G 1/168* (2013.01); *A47G 1/17* (2013.01); *G06F 3/042* (2013.01)

(58) Field of Classification Search
CPC .................................................. A47G 1/168
USPC .......................................................... 40/758
See application file for complete search history.

(56) References Cited

U.S. PATENT DOCUMENTS

| | | | | |
|---|---|---|---|---|
| 4,211,382 A | * | 7/1980 | Bonfils .................. | A47G 1/168 248/467 |
| 5,125,175 A | * | 6/1992 | Huff, Jr. .................... | G09F 1/12 40/718 |
| 5,255,458 A | * | 10/1993 | Piel ....................... | A47G 1/0638 24/487 |

(Continued)

FOREIGN PATENT DOCUMENTS

| | | |
|---|---|---|
| TW | M445218 U | 1/2013 |
| TW | M469158 U | 1/2014 |
| TW | M513625 U | 12/2015 |

OTHER PUBLICATIONS

Taiwanese Office Action dated Sep. 19, 2016, as issued in corresponding Taiwan Patent Application No. 105103167 with an English translation of pp. 1-9 as marked (17 pages).

*Primary Examiner* — Joanne Silbermann
(74) *Attorney, Agent, or Firm* — Muncy, Geissler, Olds & Lowe, P.C.

(57) ABSTRACT

A frame assembly is disclosed, which is mounted on an object surface. The frame assembly includes a frame and at least a frame fastening assembly. The frame fastening assembly includes a first fastening member, a second fastening member and an anti-skid member. The first fastening member has a first magnetic element and an adhered surface, and the adhered surface adheres on the object surface. The second fastening member has a second magnetic element, a supporting portion and a fastening portion, the second magnetic element magnetic attracts the first magnetic element, the supporting portion bears the frame and the fastening portion covers parts lateral surface of the frame. The anti-skid member is disposed on a surface of the second fastening member, wherein the surface is opposite to the fastening portion.

21 Claims, 7 Drawing Sheets

(56) References Cited

U.S. PATENT DOCUMENTS

| | | | | | |
|---|---|---|---|---|---|
| 5,675,874 | A | * | 10/1997 | Chen | A41F 1/002 24/303 |
| 5,947,437 | A | * | 9/1999 | Tate | A47G 1/17 248/216.1 |
| 8,434,730 | B2 | * | 5/2013 | Ahlstrom | A47G 1/168 248/206.5 |
| 2011/0270033 | A1 | * | 11/2011 | Jackson | A61H 19/00 600/38 |
| 2014/0069882 | A1 | * | 3/2014 | Cheng | A47F 5/0018 211/150 |

* cited by examiner

FRAME FASTENING ASSEMBLY, FRAME ASSEMBLY AND METHOD OF MOUNTING A FRAME

BACKGROUND OF THE INVENTION

1. Field of the Invention

The present disclosure relates to a frame assembly and a method of mounting a frame, particularly to a frame fastening assembly capable of mounting a frame on an object surface.

2. Description of the Related Art

Figure 1:
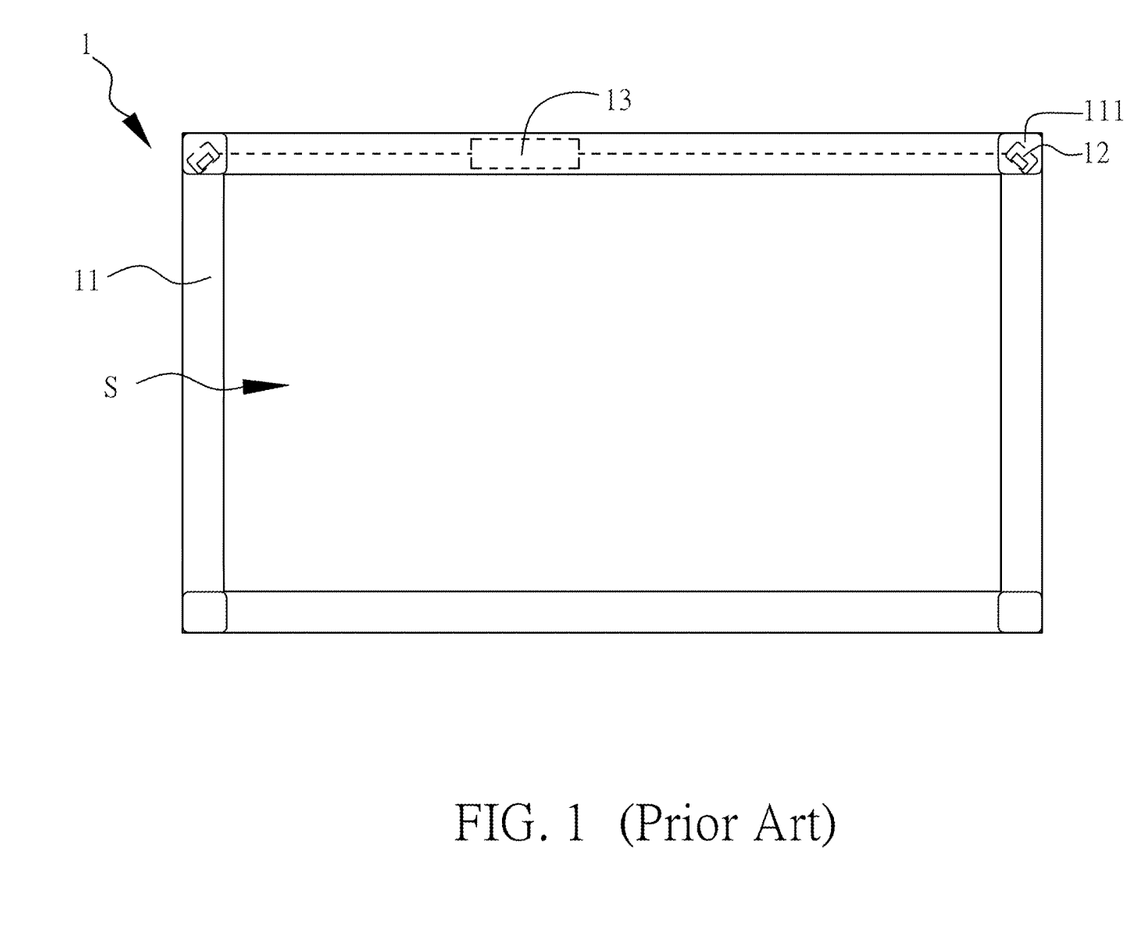
FIG. 1 is a schematic drawing of a conventional optical touch frame.

In general, a frame is often mounted on the wall to show the object. With the advancement of technology, the current projection technology is further used with the optical touch frame to achieve the effect of interactive projection. FIG. 1 is a schematic drawing of a conventional optical touch frame. Please refer to FIG. 1. The conventional optical touch frame 1 has a frame 11, which has the shape of a quadrangle and hollow center. A camera 12 is disposed within a corner structure 111 of the frame 11. Preferably, there are two or four cameras 12. FIG. 1 uses two cameras 12 as an example. Also, the optical touch frame 1 further includes a processor 13, which is disposed inside the frame 11 and coupled to the camera 12.

The optical touch frame 1 can be mounted on the surface S of the wall, blackboard, whiteboard or glass. When something, such as human's finger, is contact with the surface S inside the frame 11, and through the internal sensing of the camera 12 and calculation processing of the processor 13, a coordinate axis of the contact can be obtained.

Regardless of the use of a general frame or the optical touch frame 1, by using double-sided adhesive to adhere on a specific surface of the frame 11, so that the optical touch frame 1 can adhere to the surface of the wall, blackboard, whiteboard, or glass. However, in view of using the double-sided adhesive, it is quite inconvenient to clear adhesive residues when disassembling the frame. Currently, there is an approach of using the magnetic attraction. Through a magnetic element mounted on the frame 11, the optical touch frame 1 adheres to a magnetic whiteboard or glass in a manner of magnetic attraction, which is only limited to the application in adhering to an object having magnetism.

SUMMARY OF THE INVENTION

It is a major objective of the present disclosure to provide a frame assembly and a frame fastening assembly thereof. The frame fastening assembly has a first fastening member and a second fastening member connected to each other in a manner of magnetic attraction. Also, the first fastening member includes an adhered surface, such that the first fastening member can adhere to an object surface. The second fastening member includes a supporting portion and a fastening portion used for bearing and fastening a frame. Through the aforementioned structure, a frame can be mounted onto a surface of an object quickly. Also, the object does not require any additionally mounted magnetic element. Preferably, the adhered surface has repeated adhesive properties, which can be disassembled easily, and after use without having to remove adhesive residue. This solves conventional limitations on mounting a frame.

It is another major objective of the present disclosure to provide a method of mounting a frame, according to the structure and the property of the frame fastening assembly described above, wherein the first fastening member adheres on an object surface, and the second fastening member attracts the first fastening member in a manner of magnetic attraction. At last, the frame is disposed within the space formed by the supporting portion of the second fastening member, the fastening portion, and the object surface. Thereby, the objective of mounting a frame quickly can be achieved.

To achieve the above objectives, the present disclosure provides a frame fastening assembly used for mounting a frame on an object surface. The frame fastening assembly includes a first fastening member, a second fastening member, and an anti-skid member. The first fastening member includes a first magnetic element and an adhered surface which adheres on an object surface. The second fastening member includes a second magnetic element, a supporting portion, and a fastening portion. The second magnetic element attracts the first magnetic element, the supporting portion bears the frame, and the fastening portion covers parts of lateral surface of the frame. The anti-skid member is disposed on a surface of the second fastening member, wherein the surface is opposite to the fastening portion.

The present disclosure further provides a frame assembly mounted on an object surface. The frame assembly includes a frame and at least a frame fastening assembly. The frame fastening assembly includes a first fastening member, a second fastening member and an anti-skid member. The first fastening member includes a first magnetic element and an adhered surface. The adhered surface adheres on the object surface. The second fastening member includes a second magnetic element, a supporting portion and a fastening portion. The second magnetic element attracts the first magnetic element, the supporting portion bears the frame, and the fastening portion covers parts of lateral side of the frame. The anti-skid member is disposed on a surface of the second fastening member, wherein the surface is opposite to the fastening portion.

The present disclosure further provides a method of mounting a frame, comprising the following steps: providing a first fastening member, which includes a first magnetic element and an adhered surface; adhering the adhered surface on an object surface; providing a second fastening member, which includes a second magnetic element, a supporting portion and a fastening portion; placing an anti-skid member on a surface of the second fastening member, wherein the surface is opposite to the fastening portion; placing the second fastening member close to the first fastening member, such that the second magnetic element attracts the first magnetic element; and placing a frame onto the supporting portion such that the supporting portion bears the frame and the fastening portion covers parts of lateral side of the frame.

In an embodiment of the present disclosure, the adhered surface has repeated adhesive properties, which means the adhered surface has the feature of being adhered repeatedly.

In an embodiment of the present disclosure, the first fastening member is a sucker structure, and the adhered surface is an absorbed surface.

In an embodiment of the present disclosure, the material of the first fastening member is polymerized siloxane, and the adhered surface is a pressure sensitive adhesive (PSA) layer.

In an embodiment of the present disclosure, the second fastening member further includes an accommodating portion. The second magnetic element is disposed within the accommodating portion.

In an embodiment of the present disclosure, the anti-skid member includes a hollow portion, such that the first magnetic element passes through the hollow portion to attract the second magnetic element.

In an embodiment of the present disclosure, the anti-skid member is disposed between the second fastening member and the object surface.

In an embodiment of the present disclosure, the anti-skid member is disposed in an outer edge of the surface of the second fastening member, and the surface is opposite to the fastening portion.

In an embodiment of the present disclosure, the anti-skid member includes a hollow portion, and the anti-skid member and the hollow portion form an L-shaped structure.

In an embodiment of the present disclosure, the structure of the supporting portion corresponds to a corner structure of the frame.

In an embodiment of the present disclosure, the frame includes at least a corner structure.

In an embodiment of the present disclosure, the frame assembly further includes at least a camera and a processor. The cameras are disposed in the corner structures respectively, and the processor is disposed in the frame.

DETAILED DESCRIPTION OF THE PREFERRED EMBODIMENT

Hereafter, the technical content of the present disclosure will be better understood with reference to preferred embodiments.

Figure 2:
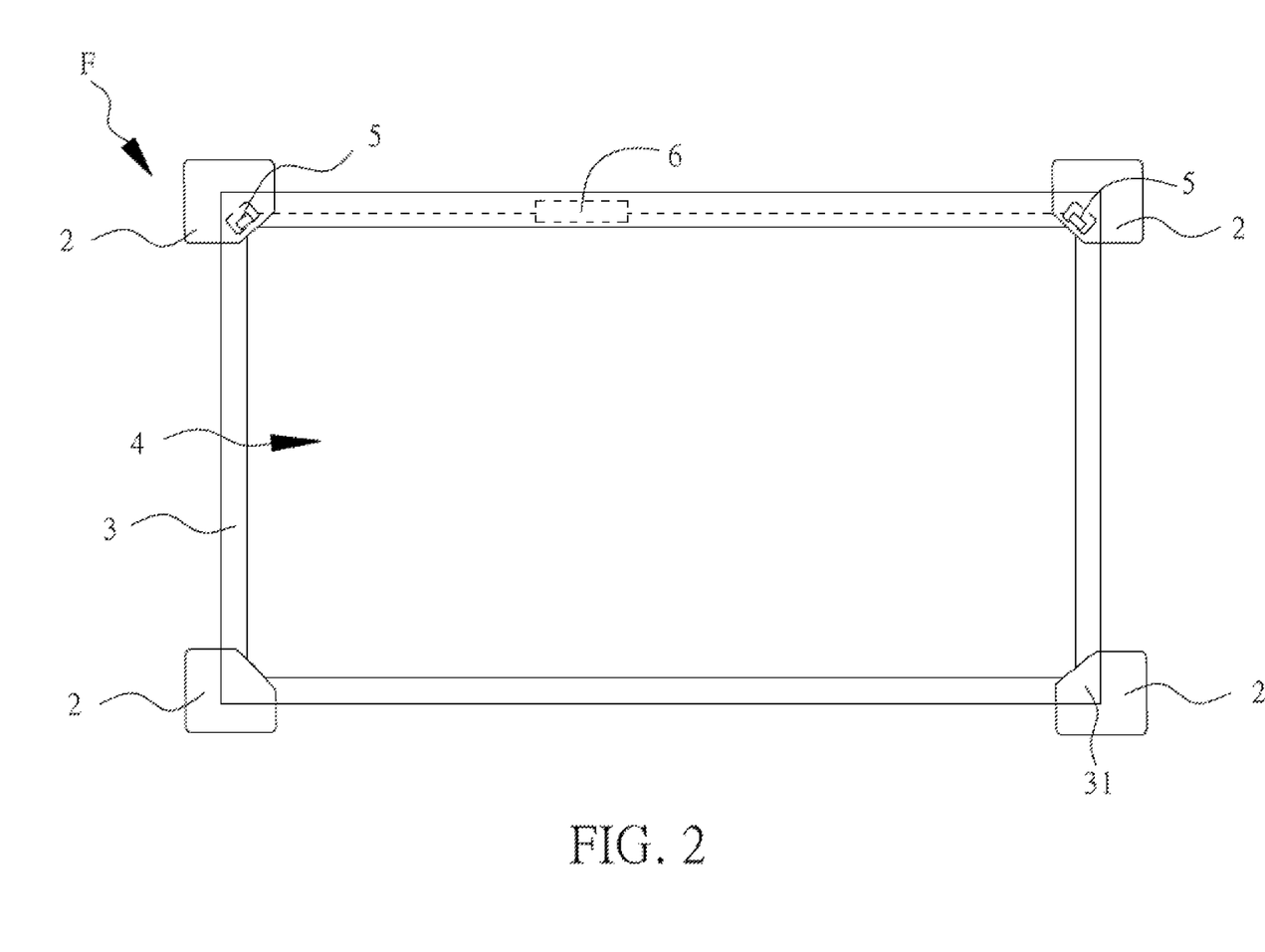
FIG. 2 is a schematic drawing of a frame assembly according to an embodiment of the present disclosure.
Figure 3:
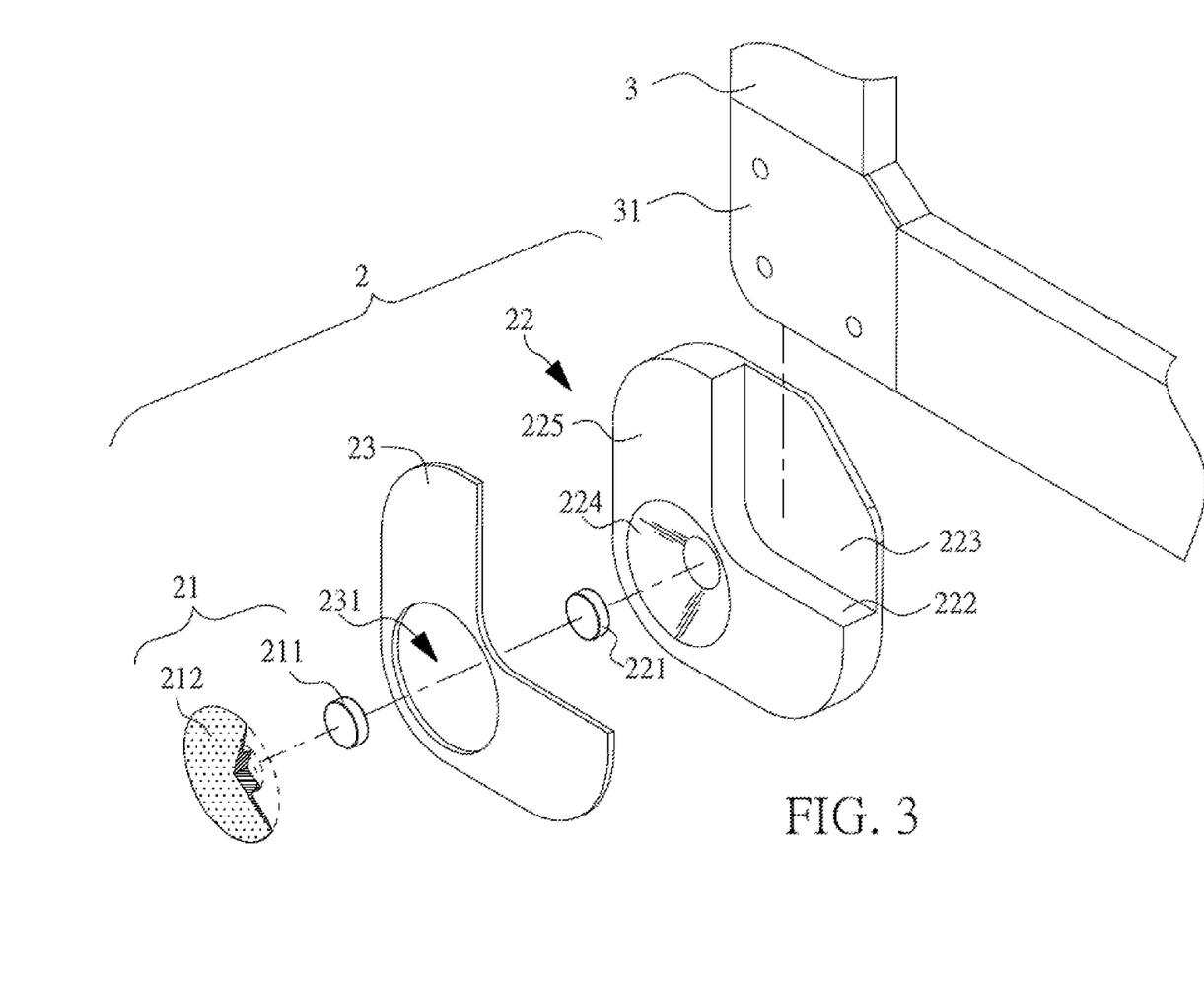
FIG. 3 is an exploded schematic drawing of the frame fastening assembly shown in FIG. 2.

FIG. 2 is a schematic drawing of a frame assembly according to an embodiment of the present disclosure. FIG. 3 is an exploded schematic drawing of the frame fastening assembly as shown in FIG. 2. Please refer to both FIG. 2 and FIG. 3. The frame assembly F in the present embodiment includes at least a frame fastening assembly 2 and a frame 3. The frame fastening assembly 2 is used to mount the frame 3 on an object surface 4. Specifically, the type of the frame 3 and the object surface 4 is not limited in the present disclosure. For example, the frame 3 may be a general frame for the display, or an optical touch frame as described in the art. As to the frame 3 in the present embodiment, the optical touch frame in a rectangular shape is used for illustration. Thus, the frame 3 includes four corner structures 31 (for the sake of drawing simplicity, only one of the corner structures 31 is shown in FIG. 2). The frame assembly F further includes at least a camera 5 and a processor 6. The present embodiment includes two cameras 5 disposed in two corner structures 31 of the frame 3 respectively. The processor 6 is disposed in the frame 3. The function of the camera 5 and the processor 6 has been described in the prior art. Thus, it will not be described in detail herein.

Also, the object surface 4 may be, but not limited to the surface of the wall, whiteboard, blackboard, or glass. Therefore, the frame fastening assembly 2 of the present embodiment enables various types of frame 3 to be mounted on a surface of the wall, whiteboard, blackboard, or glass.

As shown in FIG. 3, the frame fastening assembly 2 includes a first fastening member 21, a second fastening member 22, and an anti-skid member 23. Specifically, the first fastening member 21 includes a first magnetic element 211 and an adhered surface 212. The second fastening member 22 includes a second magnetic element 221, a supporting portion 222 and a fastening portion 223. The first fastening member 21 is connected to the second fastening member 22 in a manner of magnetic attraction (through the first magnetic element 211 and the second magnetic element 221).

Hereinafter, the structural feature of the first fastening member 21 is described first. The first magnetic element 211 and the adhered surface 212 in the present embodiment are disposed on opposite sides of the first fastening member 21. That is, the first magnetic element 211 is disposed on one side, and the adhered surface 212 is disposed on the opposite side. Certainly, in other embodiments, the first magnetic element 211 can also be disposed inside the first fastening member 21 as long as the first magnetic element 211 can attract the second magnetic element 221 of the second fastening member 22, but the present disclosure is not limited thereto.

Figure 4:
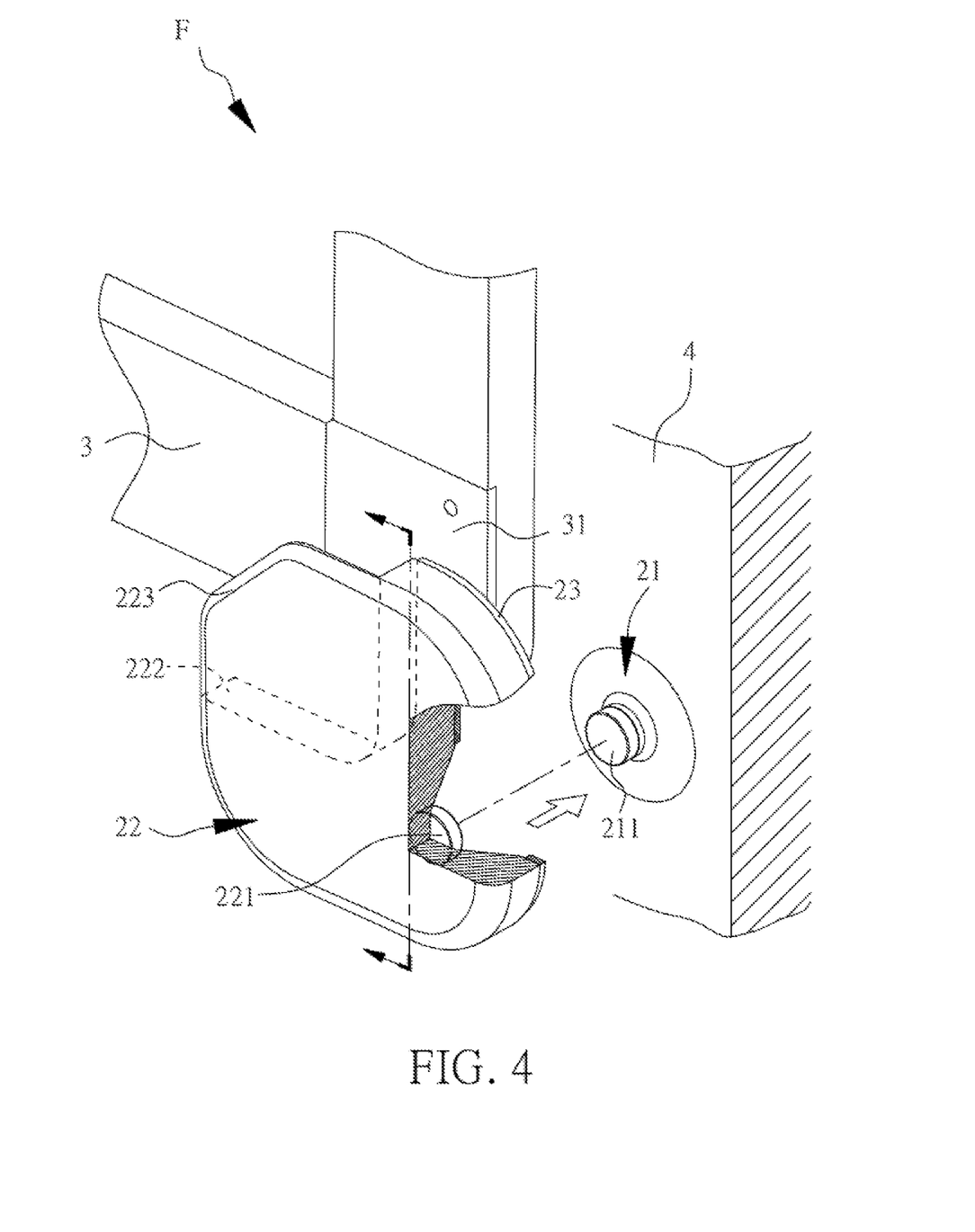
FIG. 4 is a schematic drawing showing the use state of the frame fastening assembly shown in FIG. 3.

Also, the adhered surface 212 in the present embodiment has repeated adhesive properties, which means the adhered surface has the feature of being adhered repeatedly, such that it can adhere on the object surface 4 when it is used, as shown in FIG. 4. FIG. 4 is a schematic drawing showing the use state of the frame fastening assembly shown in FIG. 3. Preferably, the first fastening member 21 may be sticky silicone molding. That is, the main structure of the first fastening member 21 is polymerized siloxane, also known as silicone, and the adhered surface 212 is a pressure sensitive adhesive (PSA) layer. In other words, coating the PSA on one side of the first fastening member 21 (polymerized siloxane) can form a PSA layer.

With the repeated adhesive properties of the pressure PSA, so that the first fastening member 21 can adhere on the object surface 4 repeatedly. Also, when the frame fastening assembly 2 is disassembled, the first fastening member 21 can be removed from the object surface 4 directly without worry about the residual gum. Besides, the PSA can generate stickiness when an external force is applied and have repeated adhesive properties, which is common knowledge to those skilled in the art.

In other embodiments, the first fastening member 21 may also be a sucker structure, wherein the absorbed surface of the sucker structure is the adhered surface 212 of the present embodiment. Also, the first magnetic element 211 is disposed in the opposite side of the absorbed surface. When using the sucker structure as the first fastening member 21, the absorbed surface adheres tightly to the object surface 4, and air between the absorbed surface and the object surface 4 is excluded, by which the effect of vacuum suction is achieved and the first fastening member 21 adheres to the object surface 4. Similarly, when the sucker structure is disassembled, there is no need to worry about the problem of adhesive residue. Regardless of using PSA or a sucker structure to achieve the repeated adhesive effect, this is not limited to the material of the object surface 4.

The second fastening member 22 in the present embodiment includes a second magnetic element 221 used to attract the first magnetic element 211, such that the second fastening member 22 can be mounted on the object surface 4. Similarly, the second magnetic element 221 can be disposed inside the second fastening member 22 or on its surface as long as the second magnetic element 221 can attract the first magnetic element 211, but the present disclosure is not limited thereto.

Preferably, the second fastening member 22 further includes an accommodating portion 224, which is a concave. Also, the second magnetic element 221 can be disposed within the accommodating portion 224. Specifically, the second magnetic element 221 in the present embodiment is fastened to the bottom of the accommodating portion 224 in an adhesive manner. Certainly, in other embodiments, other engaging structures can also be designed for the second magnetic element 221 to be fastened to the accommodating portion 224. More preferably, the structure of the accommodating portion 224 corresponds to the first fastening member 21. Thus, when the first magnetic element 211 attracts the second magnetic element 22, the first fastening member 21 can also be disposed within the accommodating portion 224 for the better decorative and space-saving effect.

The supporting portion 222 and the fastening portion 223 of the second fastening member 22 can bear the frame 3. Specifically, when the second fastening member 22 is mounted on the object surface 4, the supporting portion 222 and the fastening portion 223 of the second fastening member 22 and the object surface 4 can form a space (as shown in FIG. 4), such that the frame 3 can be accommodated within the space. Specifically, the supporting portion 222 bears the frame 3, such that the fastening portion 223 covers parts of lateral side of the frame 3. In other words, the supporting portion 222 is used to fasten the frame 3 in a vertical direction, and the fastening portion 223 is used to fasten the frame 3 in a horizontal direction.

Preferably, the structure of the supporting portion 222 corresponds to the shape of parts of the frame 3 which is supported by the supporting portion 222. Specifically, the frame 3 in the present embodiment is a quadrangular structure, as shown in FIG. 2, and thus includes four L-shaped corner structures 31. Therefore, as shown in FIG. 3, the configuration of the supporting portion 222 corresponds to the shape of the corner structure 31, i.e. the supporting portion 222 is in an L shape.

Figure 5:
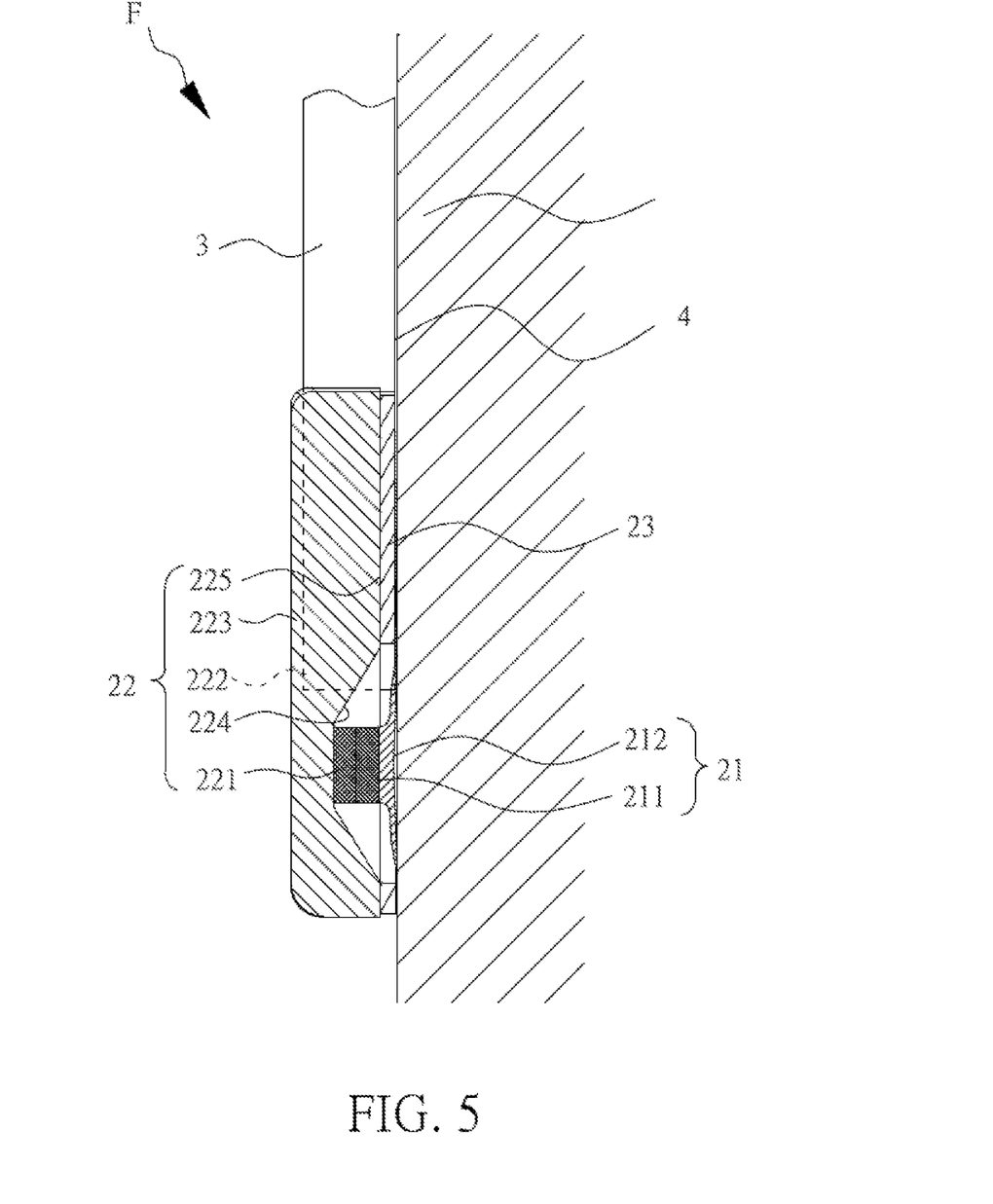
FIG. 5 is a schematic drawing after the assembling of the frame fastening assembly shown in FIG. 4.

In addition, the frame fastening assembly 2 in the present embodiment further includes an anti-skid member 23. The anti-skid member 23 is disposed on a surface 225 of the second fastening member 22, wherein the surface 225 is opposite to the fastening portion 223. That is, when used, the anti-skid member 23 is close to the surface 225 adjacent to the object surface 4, as shown in FIG. 5 which is a schematic drawing after the assembling of the frame fastening assembly shown in FIG. 4. Preferably, the configuration of the anti-skid member 23 may follow the shape of the second fastening member 22, such that the anti-skid member 23 could completely cover the surface 225. Specifically, the material of the anti-skid member 23 may be, for example (but not limited to), rubber, silicone or PVC foam and other materials with non-slip effect.

When the first magnetic element 211 attracts the second magnetic element 221, the anti-skid member 23 is disposed between the second fastening member 22 and the object surface 4. Whereby, when a heavy object (the frame 3) is placed onto the second fastening member 22, the situation that the second fastening member 22 slides or has offset relative to the object surface 4 may be prevented, which achieves a non-slip effect and objective.

In addition, preferably, in view of the special structure on the surface 225 of the second fastening member 22, such as the supporting portion 222 and the accommodating portion 224, the anti-skid member 23 may also be designed to operate with the specific structure, as shown in FIG. 3. For example, the anti-skid member 23 corresponds to the L-shaped supporting portion 222 may also have an L-shaped notch. Also, the anti-skid member 23 includes a hollow portion 231 to correspond to the accommodating portion 224 of the second fastening member 22 such the first magnetic element 211 can pass through the hollow portion 231 to attract the second magnetic element 221.

Figure 6:
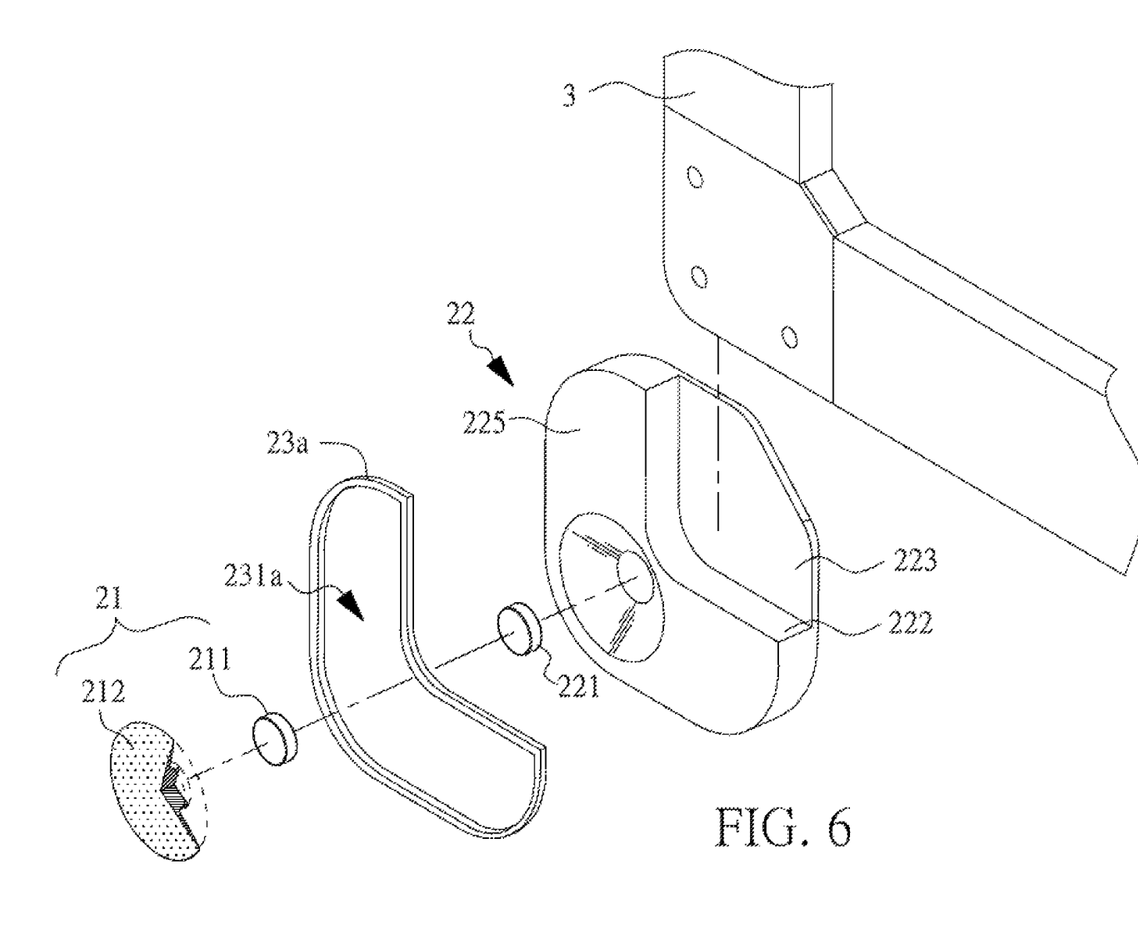
FIG. 6 is a schematic drawing of an anti-skid member shown in FIG. 3 in another embodiment.

Certainly, the present disclosure does not limit the amount and configuration of the anti-skid member 23, such that the anti-skid member 23 can be disposed on parts of the surface 225, which can achieve the same effect. Specifically, the frame fastening assembly 2 may also include a plurality of anti-skid members 23 whose configurations are not limited. The plurality of anti-skid members 23 may be dispersedly arranged on the surface 225 of the second fastening member 22, which can achieve the same anti-slip effect. Further, as shown in FIG. 6 which is a schematic drawing of the anti-skid member shown in FIG. 3 in another embodiment. The anti-skid member 23a may also be designed according to the outer edge of the second fastening member 22, such that the anti-skid member 23a and its hollow portion 231a are both an L-shaped structure. Accordingly, the anti-skid member 23a can be disposed in the outer edge of the surface 225 of the second fastening member 22. This design can also achieve non-slip effect.

Figure 7:
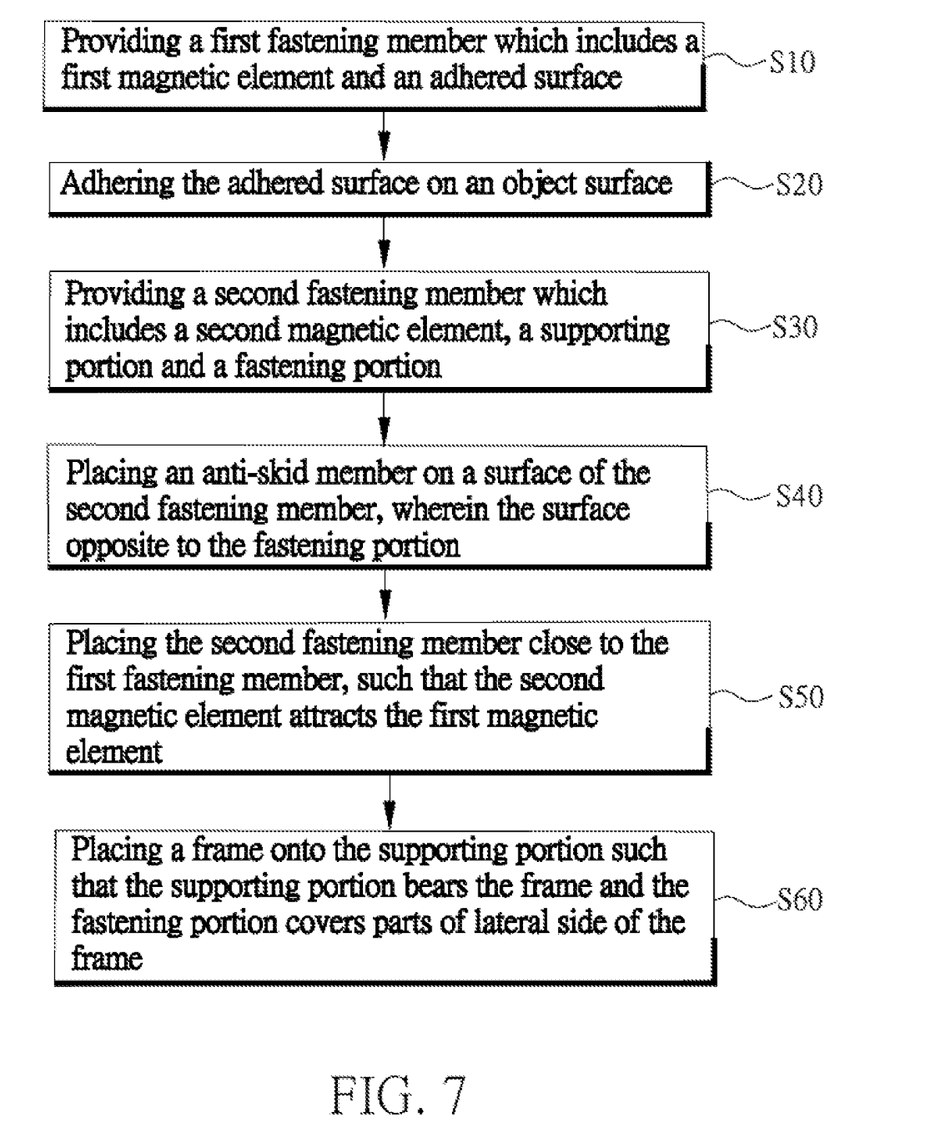
FIG. 7 is a flowchart showing a method of mounting a frame according to an embodiment of the present disclosure.

In addition, the present disclosure also provides a method of mounting a frame, hereinafter referred to a mounting method, in which the frame fastening assembly 2 in the aforementioned embodiment is used for mounting the frame 3 on an object surface 4. FIG. 7 is a flowchart showing a method of mounting a frame according to an embodiment of the present disclosure. Please refer to FIG. 7. The method of mounting a frame in the present embodiment includes the following steps: providing a first fastening member 21 which includes a first magnetic element 211 and an adhered surface 212 (Step S10); adhering the adhered surface 212 on an object surface 4 (Step S20); providing a second fastening member 22 which includes a second magnetic element 221, a supporting portion 222 and a fastening portion 223 (Step S30); placing an anti-skid member 23 on a surface 225 of the second fastening member 22, wherein the surface is opposite to the fastening portion 223 (Step S40); placing the second fastening member 22 close to the first fastening member 21, such that the second magnetic element 221 attracts the first magnetic element 211 (Step S50); and placing a frame 3 to the supporting portion 222 such that the supporting portion 222 bears the frame 3 and the fastening portion 223 covers parts of lateral side of the frame 3 (Step S60).

The detailed structure of the frame fastening assembly 2 has been described in detail in the foregoing embodiment. Refer to the aforementioned embodiment for the structure and features of the frame fastening assembly 2 and the frame 3 in the method of mounting a frame, which will not be repeated herein. The method of using the frame fastening assembly 2 will be described hereinafter. First, providing the first fastening member 21 (Step S10) which faces the object surface 4 of the adhered surface 212, as shown in FIG. 4. The object surface 4 may be the surface of the wall, blackboard, whiteboard, or glass. Then, pressing the first fastening member 21, such that the adhered surface 212 adheres to the object surface 4 (Step S20), thereby the first fastening member 21 is mounted onto the object surface 4.

Then, providing the second fastening member 22 (Step S30), and placing the anti-skid member 23 on the surface 225 of the second fastening member 22, wherein the surface 225 is opposite to the fastening portion 223 (Step S40). It should be specifically noted that the present disclosure is not limited to the operation procedure of Step S30 and S40. To be more specific, the frame fastening assemblies 2 provided to users may be three single members, including the first fastening member 21, the second fastening member 22, and the anti-skid member 23 (referring to FIG. 3). Before the frame 3 is mounted, the user can first fasten the anti-skid member 23 on the surface 225 of the second fastening member 22 (referring to FIG. 4). In such aspect, Step S30 and S40 may be performed before or after Step S20, but the present disclosure is not limited thereto.

Certainly, the frame fastening assembly 2 provided to users may also be two single members, including the first fastening member 21 and the second fastening member 22 that are assembled to the anti-skid member 23 respectively (referring to FIG. 4). In other words, when the frame fastening assembly 2 is manufactured, the anti-skid member 23 can be directly fastened to the second fastening member 22, or the second fastening member 22 and the anti-skid member 23 can even form a single member through two-shot molding, but the present disclosure is not limited thereto. In such aspect, Step S30 and S40 are performed before Step S20.

Then, as indicated by the arrow symbol shown in FIG. 4, placing the second fastening member 22 with the anti-skid member 23 on its surface 225 close to the first fastening member 21, such that the second magnetic element 221 attracts the first magnetic element 211 (Step S50), fastening the second fastening member 22 and the anti-skid member 23 on the object surface 4, as shown in FIG. 5. At this time, the anti-skid member 23 is disposed between the second fastening member 22 and the object surface 4 to achieve the anti-slip effect.

Preferably, Step S10 to Step S50 can be repeated twice. That is, after two frame fastening assemblies 2 are mounted on the object surface 4, the user can enter Step S60, placing the frame 3 in the space formed by the supporting portion 222, the fastening portion 223, and the object surface 4 to lets the supporting portion 222 bear the frame 3, and the fastening portion 223 cover parts of lateral side of the frame 3, such that the frame 3 is mounted on the object surface 4, as shown in FIG. 5. Then, the two upper frame fastening assemblies 2 can be mounted in the same way.

More preferably, first, the size of the frame 3 is estimated, and four first fastening members 21 adhere to the object surface 4 according to the size of the frame 3. Then, the two lower second fastening members 22 are mounted, and a frame is disposed in the supporting portion 222. At last, the two upper second fastening members 22 are mounted such that the frame 3 can be properly mounted on the object surface 4.

Accordingly, since the first fastening member includes the adhered surface having the repeated adhesive property, after the adhered surface adheres to the object surface, the second fastening member is mounted onto the object surface by means of the attraction between the first magnetic element and the second magnetic element, such that the frame can be disposed between the supporting portion and the fastening portion of the second fastening member. Through the aforementioned structure, the frame can be fastened to the object surface quickly without any additional magnetic element mounted on the object. The frame can be disassembled easily without a need to remove adhesive residue. This solves the conventional limitations on mounting a frame.

It should be noted that the described embodiments are only for illustrative and exemplary, and that various changes and modifications may be made to the described embodiments without departing from the scope of the disclosure as disposed by the appended claims.

What is claimed is:

1. A frame fastening assembly, used for mounting a frame on an object surface, the frame fastening assembly comprising:
   a first fastening member, including a first magnetic element and an adhered surface which adheres on the object surface;
   a second fastening member, including a second magnetic element, a supporting portion, a fastening portion, and an accommodating portion, the accommodating portion is a concave, the second magnetic element disposed in the accommodating portion, the structure of the accommodating portion corresponds to the first fastening member, wherein the second magnetic element attracts the first magnetic element, the first fastening member disposed within the accommodating portion, the supporting portion bears the frame, and the fastening portion covers parts of lateral side of the frame; and
   an anti-skid member, disposed on a surface of the second fastening member, wherein the surface is opposite to the fastening portion.

2. The frame fastening assembly as claimed in claim 1, wherein the adhered surface has repeated adhesive properties.

3. The frame fastening assembly as claimed in claim 1, wherein the first fastening member is a sucker structure, and the adhered surface is an absorbed surface.

4. The frame fastening assembly as claimed in claim 1, wherein the material of the first fastening member is polymerized siloxane, and the adhered surface is a pressure sensitive adhesive layer.

5. The frame fastening assembly as claimed in claim 1, wherein the anti-skid member includes a hollow portion, such that the first magnetic element passes through the hollow portion to attract the second magnetic element.

6. The frame fastening assembly as claimed in claim 5, wherein the anti-skid member is disposed between the second fastening member and the object surface.

7. The frame fastening assembly as claimed in claim 1, wherein the anti-skid member is disposed in an outer edge of the surface of the second fastening member, and the surface is opposite to the fastening portion.

8. The frame fastening assembly as claimed in claim 7, wherein the anti-skid member includes a hollow portion, and the anti-skid member and the hollow portion form an L-shaped structure.

9. The frame fastening assembly as claimed in claim 1, wherein the structure of the supporting portion corresponds to a corner structure of the frame.

10. A frame assembly, mounted on an object surface, the frame assembly comprising:
   a frame; and
   at least a frame fastening assembly, comprising:
      a first fastening member, including a first magnetic element and an adhered surface which adheres on the object surface;
      a second fastening member, including a second magnetic element, a supporting portion, a fastening portion, and an accommodating portion, the accommodating portion is a concave, the second magnetic element disposed in the accommodating portion, the structure of the accommodating portion corresponds to the first fastening member, wherein the second magnetic element attracts the first magnetic element, the first fastening member disposed within the accommodating portion, the supporting portion bears the frame, and the fastening portion covers parts of lateral side of the frame; and an anti-skid member, disposed on a surface of the second fastening member, wherein the surface is opposite to the fastening portion.

11. The frame assembly as claimed in claim 10, wherein the frame includes at least a corner structure.

12. The frame assembly as claimed in claim 11, further comprising:

at least a camera, disposed in the corner structures respectively; and a processor, which is disposed in the frame.

13. The frame assembly as claimed in claim 11, wherein the structure of the supporting portion corresponds to the corner structure.

14. The frame assembly as claimed in claim 10, wherein the adhered surface has repeated adhesive properties.

15. The frame assembly as claimed in claim 10, wherein the first fastening member is a sucker structure, and the adhered surface is an absorbed surface.

16. The frame assembly as claimed in claim 10, wherein the material of the first fastening member is polymerized siloxane, and the adhered surface is a pressure sensitive adhesive layer.

17. The frame assembly as claimed in claim 10, wherein the anti-skid member includes a hollow portion such that the first magnetic element passes through the hollow portion to attract the second magnetic element.

18. The frame assembly as claimed in claim 17, wherein the anti-skid member is disposed between the second fastening member and the object surface.

19. The frame assembly as claimed in claim 10, wherein the anti-skid member is disposed in the outer edge of the surface of the second fastening member, wherein the surface is opposite to the fastening portion.

20. The frame assembly as claimed in claim 19, wherein the anti-skid member includes a hollow portion, and the anti-skid member and the hollow portion forms a L-shaped structure.

21. A method of mounting a frame, comprising the following steps:

providing a first fastening member, which includes a first magnetic element and an adhered surface;

adhering the adhered surface on an object surface;

providing a second fastening member, which includes a second magnetic element, a supporting portion, a fastening portion and an accommodating portion, the accommodating portion is a concave, the second magnetic element disposed in the accommodating portion, the structure of the accommodating portion corresponds to the first fastening member;

placing an anti-skid member on a surface of the second fastening member, wherein the surface is opposite to the fastening portion;

wherein the second fastening member is adjacent to the first fastening member, such that the second magnetic element attracts the first magnetic element, and the first fastening member disposed within the accommodating portion; and placing a frame onto the supporting portion, such that the supporting portion bears the frame and the fastening portion covers parts of lateral side of the frame.

* * * * *